(12) United States Patent
Piekniewski et al.

(10) Patent No.: US 10,818,016 B2
(45) Date of Patent: Oct. 27, 2020

(54) SYSTEMS AND METHODS FOR PREDICTIVE/RECONSTRUCTIVE VISUAL OBJECT TRACKER

(71) Applicant: BRAIN CORPORATION, San Diego, CA (US)

(72) Inventors: Filip Piekniewski, San Diego, CA (US); Micah Richert, San Diego, CA (US); Dimitry Fisher, San Diego, CA (US); Patryk Laurent, San Diego, CA (US); Csaba Petre, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 16/357,536

(22) Filed: Mar. 19, 2019

(65) Prior Publication Data

US 2019/0244365 A1 Aug. 8, 2019

Related U.S. Application Data

(63) Continuation of application No. 15/627,096, filed on Jun. 19, 2017, now Pat. No. 10,282,849.
(Continued)

(51) Int. Cl.
| | |
|---|---|
| *G06T 7/20* | (2017.01) |
| *G06T 1/60* | (2006.01) |
| *G06T 9/00* | (2006.01) |
| *G06T 7/00* | (2017.01) |
| *H04N 19/503* | (2014.01) |
| *G06F 12/08* | (2016.01) |

(52) U.S. Cl.
CPC .............. *G06T 7/20* (2013.01); *G06T 1/60* (2013.01); *G06T 7/0002* (2013.01); *G06T 9/00* (2013.01); *G06T 9/002* (2013.01); *G06T 9/004* (2013.01); *H04N 19/503* (2014.11); *G06F 12/08* (2013.01); *G06F 2212/1016* (2013.01); *G06F 2212/401* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 8,515,160 B1* | 8/2013 | Khosla | G06K 9/4623 382/156 |
| 9,367,798 B2* | 6/2016 | Coenen | G05B 13/027 |

(Continued)

*Primary Examiner* — Tsung Yin Tsai
(74) *Attorney, Agent, or Firm* — Reed Smith LLP; Sidharth Kapoor

(57) ABSTRACT

Systems and methods for predictive/reconstructive visual object tracking are disclosed. The visual object tracking has advanced abilities to track objects in scenes, which can have a variety of applications as discussed in this disclosure. In some exemplary implementations, a visual system can comprise a plurality of associative memory units, wherein each associative memory unit has a plurality of layers. The associative memory units can be communicatively coupled to each other in a hierarchical structure, wherein data in associative memory units in higher levels of the hierarchical structure are more abstract than lower associative memory units. The associative memory units can communicate to one another supplying contextual data.

24 Claims, 7 Drawing Sheets

Related U.S. Application Data

(60) Provisional application No. 62/351,588, filed on Jun. 17, 2016.

(56) References Cited

U.S. PATENT DOCUMENTS

| | | | |
|---|---|---|---|
| 10,282,849 B2* | 5/2019 | Piekniewski | G06T 1/60 |
| 2004/0258307 A1* | 12/2004 | Viola | G06K 9/4614 |
| | | | 382/190 |
| 2008/0152192 A1* | 6/2008 | Zhu | G06K 9/209 |
| | | | 382/103 |
| 2014/0056356 A1* | 2/2014 | Yu | H04N 19/51 |
| | | | 375/240.16 |
| 2015/0117704 A1* | 4/2015 | Bulan | G06T 7/20 |
| | | | 382/103 |
| 2015/0178620 A1* | 6/2015 | Ascari | G06N 3/063 |
| | | | 706/21 |
| 2017/0091953 A1* | 3/2017 | Bleiweiss | G06T 7/246 |

\* cited by examiner

SYSTEMS AND METHODS FOR PREDICTIVE/RECONSTRUCTIVE VISUAL OBJECT TRACKER

PRIORITY

This application is continuation of U.S. patent application Ser. No. 15/627,096, filed Jun. 19, 2017, and claims the benefit of priority to U.S. Provisional Patent Application Ser. No. 62/351,588 filed Jun. 17, 2016, which are incorporated herein by reference in their entirety.

GOVERNMENT LICENSE RIGHTS

This invention was made with Government support under Contract FA9750-15-C-0178 awarded by the Air Force. The Government has certain rights in this invention.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to artificial visual systems, and more specifically to systems and methods for tracking objects with artificial visual systems.

Background

A current challenge for visual systems is the ability to visually track objects moving over time (e.g., indicate the presence and/or location of such moving objects). Compounding the difficulty of this challenge is that moving objects can vary in appearance with changes of scene properties, illumination, angle at which the moving objects are viewed, etc.

There are currently some solutions to visual object tracking. However, many of these solutions lack the scalability, robustness, generality, and/or performance to adequately work in real-world scenarios.

For example, some solutions can be non-general, providing adequate performance on training sets. However, these same solutions exhibit very poor performance when applied to actual new data sets. This problem can be particularly imposing in cases where the input data is of very high dimensionality (e.g., greater than 1000 dimensions), which may be common in visual processing applications (e.g., a small red-green-blue ("RGB") image of 100×100 pixels has 30,000 dimensions). For example, the number of degrees of freedom and ways that a solution might fit a data set grows exponentially with high dimensionality, allowing for astronomical numbers (e.g., there are $10^{72000}$ possible 100×100 pixel images, vastly exceeding the number of anything found in the physical Universe, and many more ways yet to divide those possible images into classes) of feasible solutions on the training set. In most cases, out of that astronomical number of solutions, very few will generalize in the right direction. Such may be the case in many current machine learning solutions, where the number of samples of data to correctly generalize solutions can easily exceed any number that would be practical to collect. Current attempts to reduce and/or simplify the high dimensionality may not be scalable. As a result, many current machine learning solutions are non-general and may even perform more poorly on new data with increased training on a training set—a phenomenon known as overfitting.

Accordingly, there is a need for improved systems and methods for visual object tracking.

SUMMARY

The foregoing needs are satisfied by the present disclosure, which provides for, inter alia, improved systems and method for visual object tracking. Example implementations described herein have innovative features, no single one of which is indispensable or solely responsible for their desirable attributes. Without limiting the scope of the claims, some of the advantageous features will now be summarized.

In some implementations, systems and methods for predictive/reconstructive visual object tracking are disclosed. In some cases, visual system can comprise a plurality of associative memory units, wherein each associative memory unit has a plurality of layers. The associative memory units can be communicatively coupled to each other in a hierarchical structure, wherein data in associative memory units in higher levels of the hierarchical structure are more abstract than lower associative memory units. The associative memory units can communicate to one another, such as by supplying contextual data.

In a first aspect, a predictive visual system for tracking an object in a scene over time is disclosed. In one exemplary implementation, the visual system includes a hierarchy of associative memory units, wherein the hierarchy has levels progressing from lower levels to higher levels. Each associative memory unit is configured to receive a past signal and a present signal of the scene, predict a future signal based at least on the present signal and an association between the past signal and the present signal, compress the prediction, send the compressed prediction to other associative memory units, receive compressed predictions from other associative memory units, and produce a signal indicative of the presence of the tracked object based at least on the prediction.

In one variant, the produced signal indicative of the presence of a tracked object also comprises the position of the tracked object. In another variant, the associative memory units are part of an artificial neural network. In another variant, predicting the future signal is further based at least on compressed predictions from other associative memory units. In another variant, the associative memory units of the higher levels of the hierarchy feed compressed predictions to the lower levels, wherein the compressed predictions further comprise concatenations of present signals of those associative memory units.

In another variant, associative memory units in the same level of the hierarchy feed compressed predictions to other associative memory units in the same level of the hierarchy. In another variant, each associative memory unit has a lower layer, middle layer, and upper layer. In another variant, the middle layer predicts the future signal. In another variant, the middle layer compresses the prediction.

In another variant, the visual system further includes a sensor unit configured to generate signals based at least on the scene.

In a second aspect, a reconstructive visual system for tracking an object in a scene over time is disclosed. In one exemplary implementation, the visual system includes a hierarchy of associative memory units, wherein the hierarchy has levels progressing from lower levels to higher levels and each associative memory unit is configured to: receive a present signal of the scene, reconstruct the present signal based at least on the present signal and an association relating the present signal to the reconstructed present signal, compress the reconstruction, send the compressed reconstruction to other associative memory units, receive compressed reconstructions from other associative memory units, and produce a signal indicative of the presence of the tracked object based on at least the reconstruction.

In one variant, the produced signal indicative of the presence of a tracked object also comprises the position of the tracked object. In another variant, the associative memory units are part of an artificial neural network. In another variant, predicting the future signal is further based at least on compressed predictions from other associative memory units.

In another variant, the associative memory units of the higher levels of the hierarchy feed compressed predictions to the lower levels, wherein the compressed predictions further comprise concatenations of present signals of those associative memory units. In another variant, associative memory units in the same level of the hierarchy feed compressed predictions to other associative memory units in the same level of the hierarchy. In another variant, each associative memory unit has a lower layer, middle layer, and upper layer. In another variant, the middle layer predicts the future signal. In another variant, the middle layer compresses the prediction.

In another variant, the visual system further includes a sensor unit configured to generate signals based at least on the scene.

In a third aspect, a predictive method for processing information for object tracking is disclosed. In one exemplary implementation, the method includes receiving a past signal and a present signal of a scene containing an object of interest, along with a context; associating the past signal with the present signal; predicting a future signal based at least on the present signal, said association, and the context; compressing the prediction and sending the compressed prediction to one or more associative memory units; and producing a signal indicative of the presence of the object of interest based at least on the prediction.

In a fourth aspect, a reconstructive method for object tracking is disclosed. In one exemplary implementation, the method includes: receiving a present signal of a scene containing an object of interest, along with a context; reconstructing the present signal based at least on the present signal, an association relating the present signal to the reconstructed present signal, and the context; compressing the reconstruction and sending the compressed reconstruction to one or more associative memory units; and producing a signal indicative of the presence of the object of interest based at least on the reconstruction.

In a fifth aspect, a non-transitory computer-readable storage medium is disclosed. In one exemplary implementation, the non-transitory computer-readable storage medium has a plurality of instructions stored thereon, the instructions being executable by a processing apparatus for predictive object tracking, the instructions configured to, when executed by the processing apparatus, cause the processing apparatus to: receive a past signal and a present signal of a scene containing an object of interest, along with a context; associate the past signal with the present signal; predict a future signal based at least on the present signal, said association, and the context; compress the prediction and send the compressed prediction to one or more associative memory units; and produce a signal indicative of the presence of the object of interest based at least on the prediction.

In another exemplary implementation, the non-transitory computer-readable storage medium has a plurality of instructions stored thereon, the instructions being executable by a processing apparatus for reconstructive object tracking, the instructions configured to, when executed by the processing apparatus, cause the processing apparatus to: receive a present signal of a scene containing an object of interest, along with a context; reconstruct the present signal based at least on the present signal, an association relating the present signal to the reconstructed present signal, and the context; compress the reconstruction and send the compressed reconstruction to one or more associative memory units; and produce a signal indicative of the presence of the object of interest based at least on the reconstruction.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
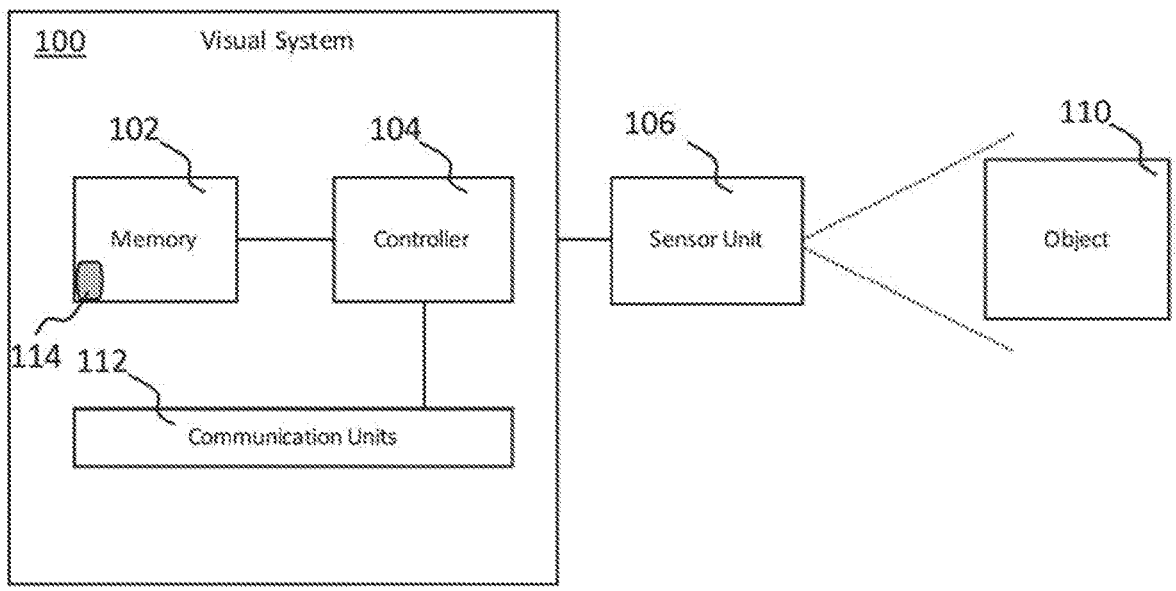
FIG. 1 is a functional block diagram of a visual system in accordance with some principles of this disclosure.

All Figures disclosed herein are © Copyright 2017 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for visual object tracking. In some implementations, the visual object tracking can include machine learning systems that learn not just features in a static image, but also features that span in time. The learned features can incorporate motion, hue changes, illumination changes, spatial and temporal contexts, and other characteristics of objects.

As used herein, objects can include anything desired to be tracked, including, without limitation, humans, animals, items, toys, cars, animate objects, inanimate objects, moving bodies, static bodies, robots, drones, signs, etc. A person having ordinary skill in the art should appreciate that this disclosure is not limited to tracking any particular kind of object.

Detailed descriptions of the various implementations and variants of the system and methods of the disclosure are now provided. Myriad other example implementations or uses for the technology described herein would be readily envisaged by those having ordinary skill in the art, given the contents of the present disclosure.

Advantageously, the systems and methods of this disclosure at least: (i) provide for improved object tracking; (ii) enable scalable and generalized solutions to tracking objects; (iii) allow for efficient utilization of processing resources; and (iv) enable automated machines (e.g., robots) to perform tasks in real-world environments. Other advantages are readily discernable by one of ordinary skill given the contents of the present disclosure.

For example, the ability to learn features that span over time, in some cases on multiple scales, can allow some visual systems of this disclosure to develop significantly improved understandings of the reality presented to the visual systems in sequences of images. In some cases, the visual systems can even develop rudimentary forms of situational awareness. Visual systems with such properties can accomplish much better object tracking results since the systems can learn how objects (and in some implementations, objects in general) look and transform in a variety of conditions, and how the appearances of the objects may change with respect to broader, scenic contexts.

As another example, human perception is heavily visual. As people design machines (e.g., robots) to automatically perform tasks that humans do, the advanced visual systems and methods described in this disclosure can enable those machines to perform tasks in dynamic environments that humans can currently work, but robots currently cannot. By way of illustration, such tasks can include autonomous navigation, guided navigation, automatic detection of objects and/or events, automotive safety (e.g., blind spot monitoring) security surveillance and other security applications, retail inventory management, customer analytics, cleaning, exploration, medicine, and any other application for robotics.

As another example, advantageously, systems and methods of this disclosure can restrict the set of analyzed features to those most relevant for making accurate predictions (e.g., in the case of predictive systems) and accurate reconstructions (e.g., in the case of reconstructive systems). In this way, systems and methods of this disclosure can impose constraints on systems that are aligned with the manifolds on which the high dimensional data reside. For example, such constraints can limit and/or reduce the number of degrees of freedom learning systems consider while learning. These constraints can act in a similar way to how weight sharing in deep convolutional neural nets limits the number of degrees of freedom for learning static images. In turn, the constraints can enhance the speed of learning. Since some computations can be performed locally (e.g., each associative memory unit works with a signal it needs to predict) there may be no global error gradient to propagate throughout the entire network (e.g., as can be used in deep networks). Consequently, systems and methods of this disclosure may avoid suffering from the well-known vanishing gradient problem, which is a challenge found in training artificial neural networks with gradient-based learning methods and/or backpropagation.

As another example, systems and methods of this disclosure can have a uniform arrangement, where associative memory units can look the same. Accordingly, this structure can be inherently parallel, uniform, and/or amenable to hardware acceleration. For example, in some implementations, multi-process code can run on multicore processors. In some implementations, the systems and methods can also be implemented on an OPENCL/CUDA compatible graphics processing unit ("GPU") or other architectures.

As another example, in some implementations, by having systems and methods that are able to predict based on motion, visual systems can become more robust. Events such as occlusion or dynamic variation would be less effective at throwing off such object tracking because such visual systems could develop predictive expectations of where objects will be similar to how a mammal might. This ability creates a level of scene understanding that is more akin to the abilities that enable humans and other animals to be so effective at tracking objects even with many disruptions in their line of sight.

Advantageously, the hierarchies of predictive/reconstructive systems described in this disclosure can be scaled both in the resolution of input signals as well as depth. The number of required training samples should remain constant with lateral scaling up of the number of units in the architecture (although the execution time may increase unless appropriate parallel hardware is allocated). Increased depth may require additional training samples, but the increase is a slowly increasing function (unlike exponential functions in the case of end to end training with backpropagation in the general case).

FIG. 1 is a functional block diagram of visual system 100 in accordance with some principles of this disclosure. In some cases, visual system 100 can comprise one or more a controller 104, memory 102, and communication units 112. A person having ordinary skill in the art would appreciate that any features described in this disclosure, including those with reference to FIG. 1, can be implemented in hardware and/or software.

Controller 104 can include one or more processors (e.g., microprocessors) and other peripherals. As used herein, the terms processor, microprocessor, and digital processor can include any type of digital processing devices such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die, or distributed across multiple components.

Controller 104 can be operatively and/or communicatively coupled to memory 102. Memory 102 can include any type of integrated circuit or other storage device adapted for storing digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 102 can provide instructions and/or data to controller 104. For example, memory 102 can be a non-transitory, computer-readable storage medium having a plurality of instructions stored thereon, the instructions being executable by a processing apparatus (e.g., controller 104) to operate visual system 100. In some cases, the instructions can be configured to, when executed by the processing apparatus, cause the processing apparatus to perform the various methods, features, and/or functionality described in this disclosure. Accordingly, controller 104 can perform logical and/or arithmetic operations based on program instructions stored within memory 102. At least portions of memory 102 can be local storage and/or at least portions of memory 102 can be remote (e.g., at a remote server).

In some implementations, memory 102 can include library 114. In some implementations, library 114 can include training data, such as images of objects. In some implementations, library 114 can include unlabeled data and/or labeled data. For example, the data in library 114 can include images taken of objects (e.g., by sensor unit 106) or generated automatically, such as with a computer program that is configured to generate/simulate library images (e.g., which can generate/simulate these library images entirely digitally or beginning from actual images of objects) from different lighting conditions, angles, sizes, distances, clarity (e.g., blurred, obstructed/occluded, partially off frame, etc.), colors, surroundings, etc. The amount of data in library 114 can depend on a number of factors. For example, the amount of data in library 114 can depend at least in part on one or more of: the amount of available data, the variability/complexity of the surrounding environment in which an object may be tracked, the complexity of the object, the variability in appearance of objects, time and/or resource costs to store and/or use the data, and/or hardware limitations such as the amount of available storage space (e.g., in library 114, memory 102, and/or on a server) and/or the bandwidth for transfer of data. For example, library 114 can contain 1, 5, 10, 100, 1000, 10,000, 100,000, 1,000,000, 10,000,000, or any number of images. In some implementations, library 114 may be stored on a network (e.g., cloud, server, etc.) and may not be stored locally.

In some implementations, sensor unit 106 can comprise systems that can detect characteristics within the field of view of sensor unit 106. Sensor units 106 can include sensors that are internal to visual system 100 or external, and/or have components that are at least partially internal and/or at least partially external. Sensor unit 106 can be communicatively coupled to visual system 100 in some implementations. Where sensor unit 106 is not communicatively coupled to visual system 100 and not part of visual system 100, the data from sensor unit 106 can be transferred to visual system 100. Sensor unit 106 can include cameras and/or any other sensors capturing visual data or data that can be represented in visual form, such as, without limitation RGB cameras, sonar, LIDAR, radar, lasers, video cameras, infrared cameras, 3D sensors, 3D cameras, medical imagers (e.g., magnetic resonance imaging ("MRI"), computer tomography ("CT"), ultrasound, etc.), and/or any other sensor known in the art. Sensor unit 106 can be used in real time object tracking, or sensor unit 106 can be used to acquire data that can then be fed into e.g., visual system 100 to track objects of interest (e.g., object 110) at a subsequent time.

Communication units 112 can include transmitters, receivers, transceivers, ports, data lines, and/or any other hardware that can send and/or receive data. For example, communication units 112 can include hardware and/or software that can wirelessly send/receive data using a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), etc.), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, networks, servers, and/or clouds can include network interfaces. Network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards. Wired coupling can include wired connections, such as any cable that has a signal line and ground. For example, such cables can include Ethernet cables, coaxial cables, Universal Serial Bus ("USB"), FireWire, and/or any wired connection known in the art.

Any of the aforementioned wired and/or wireless protocols can be used by visual system 100 to communicate to internal systems (e.g., communications between any components and/or subcomponents of visual system 100, including associative memory units) and/or external systems (e.g., computers, smart phones, tablets, data capture systems, mobile telecommunications networks, clouds, servers, and/or the like).

A person having ordinary skill in the art, given the contents of the present disclosure, would appreciate that components of visual system 100 can be local or remote. For example, portions of visual system 100 can be instantiated on a server. In some implementations, the server can comprise a collection of hardware, software, services, and/or resources that can be invoked to instantiate a virtual machine, process, or other resource for a limited or defined duration, or an unlimited or undefined duration. The server can also be called a network, cloud, etc. The server can also be communicatively and/or operatively coupled to a plurality of access points, which can include devices, systems, computers, and/or servers, including devices and/or servers that have access to the internet. Communication to the server can be performed via communication units 112.

Figure 2:
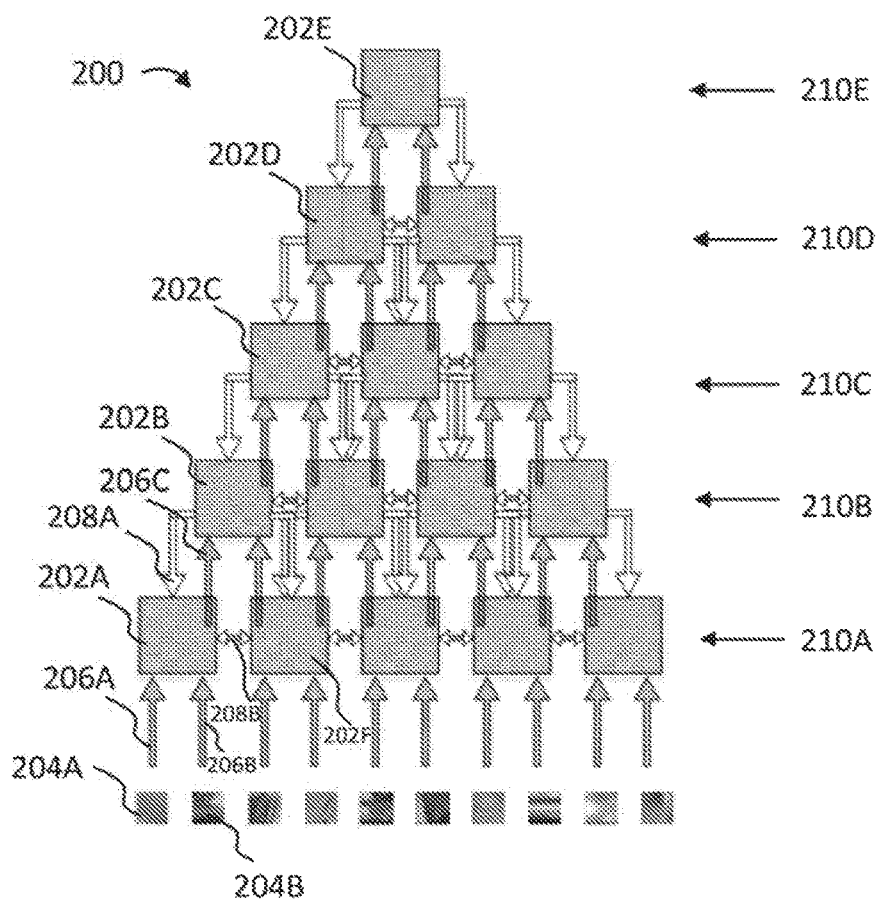
FIG. 2 is a functional block diagram illustrating the architecture of associative memory units in a hierarchical structure in accordance with some implementations of this disclosure.

FIG. 2 is a functional block diagram illustrating the architecture of associative memory units (e.g., associative memory units 202A-202F) in hierarchical structure 200 in accordance with some implementations of this disclosure. The associative memory units can utilize memory 102 for storage and/or a controller 104 for processing. It is important to note that there can be many associative memory units in some models. For example, some hierarchical structures can include a few, tens, hundreds, thousands, or more associative memory units. For example, larger models can have 1,400 or more associative memory units. The number of associative memory units can depend on the complexity of objects being tracked, complexity of object environments, types of data, and/or system performance and resource constraints. In some implementations, hierarchical structures can be designed to model animal brains and/or portions thereof. For example, the hierarchical structure can be designed to model structures found in the mammalian cortex, wherein the appropriate number of associative memory units can be chosen for biological representation.

In some implementations, hierarchical structure 200 goes from the bottom up, where each level (e.g., levels 210A-210E), operates with increasingly compressed/abstracted data. For example, data received by associative memory unit 202B in level 210B can be more compressed/abstracted than data received by associative memory unit 202A in level 210A. Data received by associative memory unit 202C in level 210C can be more compressed/abstracted than data received by associative memory unit 202B in level 210B. This same pattern can continue throughout the rest of hierarchical structure 200, such as with associative memory unit 202D in level 210D and associative memory unit 202E in level 210E. The associative memory units connect into a hierarchy, wherein there can be both vertical (e.g., forward and feedback) connections and lateral connections. A data signal (and/or a portion of a data signal) with temporal structure can come into any of the associative memory units, which can then process the data, such as with predictions and/or reconstructions of that data signal. For example, the associative memory unit can make predictions and learn associations across time.

In any case, compressed representations of the data signal received by the associative memory unit can then be outputted. This output can then be a data signal that can be processed further in other associative memory units, such as those in levels above the processing associative memory unit, and/or the output can be a data signal used as context in the same or lower levels of the associative memory units in hierarchical structure 200.

Compression (e.g., dimensionality reduction) can include reducing the received data signal into smaller amounts of data to represent ideas. Compressed data can be sent horizontally and/or vertically. Advantageously, in a way analogous to biological neuro systems, too much data may not be biologically accurate and/or helpful. Accordingly, each layer going up, through compression, can be more abstract, and based on data outputted by associative memory units in levels below. Each associative memory unit in layers going down can be narrower in that the associative memory unit may only see a narrow set of information (e.g., portion of the data).

By way of illustration, compression may be used to reduce the received data to data that is just indicative of the presence of one or more persistent features, such as object 110. In some implementations, this compression may be accomplished by segmentation of a received data signal (e.g., portioning of an image) to output only relevant portions and/or generation of data based on locating a relevant portion (e.g., location and/or presence of an object 110). Compression may also output predictive compressed features, wherein middle an associative memory unit outputs a prediction about object 110, such as a predicted presence or location.

By way of illustration, memory unit 202A can receive data signals as image strips 204A-204B. This reception is represented by arrows 206A-206B. Associative memory unit 202A can communicate laterally (e.g., with compressed representations of the data signals) to associative memory unit 202F, as represented by two-way arrow 208B, wherein associative memory unit 202A can provide context to associative memory unit 202F, and vice versa. Compressed representations of the data signal can be outputted and fed forward in arrow 206C. Also context can be fed downward from associative memory unit 202B as represented by arrow 208A. Each of arrows 206A-206C, 208A-208B, and/or any other arrow can represent wired and/or wireless communication, such as any of those mentioned with respect to communication unit 112. In many cases, the arrows can be implemented as wired data lines.

As illustrated, hierarchical structure 200 operates on image strips (e.g., image strips 204A-204B), which can be portions of an image. In some implementations one or more associative memory units can also be arranged in space corresponding, at least in part, to images processed. For example, in some implementations, hierarchical structure 200 can be arranged such that each level of the hierarchy covers a complete 2D image. As another example, in some implementations, each level can be arranged in a three-dimensional ("3D") grid covering a volume (e.g., a 3D object) if, for example, visual system 100 is tracking an object in volumetric spaces.

In hierarchical structure 200, each associative memory unit (e.g., associative memory units 202A-202F) can provide an estimate as to whether a tracked object 110 is in its view (e.g., the data it analyzes). These estimates originating in various levels of the architecture can be combined spatially and integrated into a single estimate of the position of object 110.

In some implementations, object tracking can be performed by hierarchical structure 200 in at least two stages. In an initial stage, visual system 100 can be provided with a set of unlabeled data (e.g., unlabeled videos taken by a camera) to train the predictive hierarchy of hierarchical structure 200. For example, the unlabeled data can be inputted into visual system 100 through wireless and/or wired transmission, transmitted onto a server of visual system 100, and/or stored in library 114. The video need not be labeled in any way since each next frame of the sequence serves as the signal to train the predictive/reconstructive system. This unsupervised (or self-supervised) stage of learning may be extensive and incorporate a large bank of data.

In the second stage, visual system 100 can be provided with a set of data, in some implementations, this labeled set of data can be much smaller in number than the unlabeled data in the initial stage. Again, for example, the labeled data can be inputted into visual system 100 through wireless and/or wired transmission, transmitted onto a server of visual system 100, and/or stored in library 114. The labeled data can include an object 110) shown in a variety of situations and undergoing various transitions. Much like the unlabeled data, this labeled data can also have temporal consistency (e.g., following smooth continuous trajectories) as the object 110 is shown in real, physical situations. The label indicating the position object 110 can be used to train additional classifiers in each of the associated memory units (e.g., associate memory units 202A-202F and other associated memory units) of the hierarchal structure 200 to report the presence of object 110 in the field of view of the associated memory unit.

In some implementations, visual system 100, e.g., using hierarchical structure 200, can generate readouts in the form of heatmaps indicating the likelihood of the presence of object 110 at particular locations. Such heatmaps can be generated at each level (e.g., 210A-210E) and/or at each associative memory unit.

Accordingly, the heatmaps can change from level-to-level. For example, certain types of objects may be more easily discernable at lower levels than at higher levels. By way of illustration, if object 110 appears relatively small in size in the data, object 110 may be more readily distinguishable in the lower levels of processing while there is enough detailed data (e.g., less compression) about the content of the image. As another illustration, if object 110 appears relatively large in size in the data, visual system 100 may more confidently discern it at higher levels of the hierarchical structure 200 where each unit has a large enough coverage of the visual field from the data.

In many cases, the apparent size of object 110 in data (e.g., images) can vary. For example, object 110 can move closer or further away from sensor unit 106 as sensor data is being generated. For good tracking performance, heatmaps from all levels can be incorporated and/or considered using statistical methods, including Bayesian models, averages, confidence intervals, etc. By way of illustration, in the simplest case, heatmaps can be averaged out. Other ways of weighting the heatmaps based on individual levels of confidence can also be applied. Once the final heatmap is constructed (e.g., incorporating and/or considering a plurality of levels), methods to determine the location based on the heatmap (e.g., using peaks and/or high probability areas in the heatmaps) and estimate the size of object 110 can be applied. Accordingly, based at least in part on determined locations and sizes of object 110, a final bounding box surrounding object 110 in the data can be returned in visual coordinates.

Figure 3:
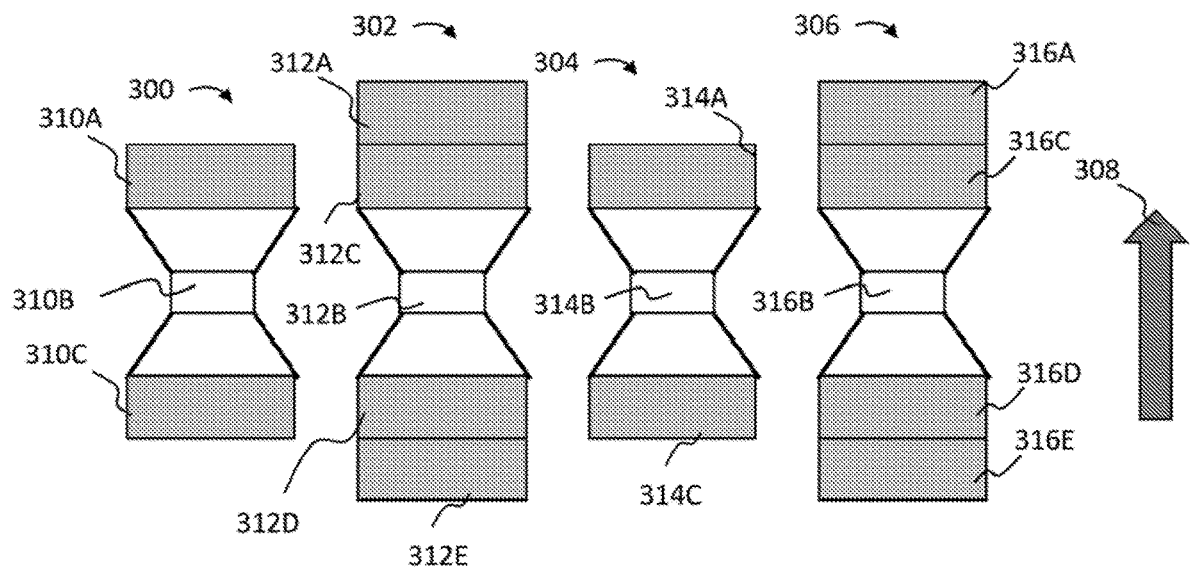
FIG. 3 is a functional block diagram of several variants of associative memory units used in stacked hierarchies in accordance with some implementations of this disclosure.

FIG. 3 is a functional block diagram of several variants of associative memory units used in stacked hierarchies (e.g., hierarchical structure 200) in accordance with some implementations of this disclosure. In some implementations, visual system 100 can include a machine learning system that learns not just data (e.g., image) features, but also features that span in time, which may incorporate motion, hue changes, illumination changes, etc. Visual system 100 can also incorporate spatial and/or temporal context of an observed scene in the data. In learning such features, in some cases on multiple scales, visual system 100 can develop a significantly improved understanding of the reality presented to it in the sequence of images, and even develop some rudimentary forms of situational awareness. Accordingly, with such properties in some implementations, visual system 100 can accomplish much better object tracking results than current models because visual system 100 can learn how object(s) (e.g., object 110) look and transform in a variety of conditions, and how the appearance of those object(s) may change with respect to the broader, whole scene context.

By way of illustration, associative memory unit 300 can include an autoencoder associating frames. Associative memory unit 302 can include an autoencoder associating pairs/sequences of frames. Associative memory unit 304 can include a predictive encoder associating consecutive frames. Associative memory unit 306 can include a predictive encoder associating shifted sequences of frames.

Such associative memory units 300, 302, 304, 306 can be implemented using artificial neural networks where there are some units in the lower layers (e.g., an input layer), some units (e.g., a smaller number of units than in the input layer) in the middle layer (e.g., where compression occurs), and again some units (e.g., a larger number of units than the middle layer) in the upper layer (e.g., an output layer).

As illustrated, each frame box 310A, 310C, 312A, 312C, 312D, 312E, 314A, 314C, 316A, 316C, 316D, 316E corresponds at least in part to a set of data signals (e.g., image pixel signals) originated from a sensor unit (e.g., sensor unit 106) and/or to an ordered spatial arrangement of activation signals originating from a lower level of the hierarchy. These data signals (e.g., pixels or activations) can be represented numerically, such as in a range of values. For example, these signals can be represented as floating point values between 0 and 1.

Middle layers 310B, 312B, 314B, 316B, also called bottlenecks, can be the processing layer that creates compressed representations of data. Depending on the timing in which signals are fed into visual system 100 and associated, visual system 100 can be a predictive system or a reconstructive system. A predictive system can associate future frames with a set of past/present frames. A reconstructive system can associate a set of frames with themselves. For object tracking, these systems can behave substantially similarly. As indicated by arrow 308, the illustrated systems move upwards in that the inputs are the lower layers (e.g., frames 310C, 312D, 312E, 314C, 316D, 316E) illustrated below the middle layers (e.g., middle layers 310B, 312B, 314B, 316B), and the associated outputs are the upper layers (e.g., frames 310A, 312A, 312C, 314A, 316A, 316C) illustrated above the middle layers.

By way of illustration, associative memory units 300, 302 can be reconstructive. For example, associative memory unit 300 can receive frame 310C in the lower layer, wherein frame 310 includes a data signal from time t. Associative memory unit 300 can then associate frame 310C with the upper layer including frame 310A, which can be a substantially similar representation (e.g., reconstruction) of frame 310C also from time t. Similarly, associative memory unit 302 can receive frames 312D, 312E, which can be data signals from times t and t+1, respectively. Associative memory unit 302 can then associate frames 312D, 312E with output frames 312A, 312C, which can be substantially similar representations (e.g., reconstructions) of frames 312D, 312E also from time t and t+1, respectively.

As another illustration, associative memory units 304, 306 can be predictive. For example, associative memory unit 304 can receive frame 314C, which can be a data signal from time t, and associate frame 314C with output frame 314A, which can be a prediction based on data from frame 314C from time t+1. Similarly, associative memory unit 306 can receive frame 316D from time t and frame 316E from time t−1 and associate frames 316D, 316E with frames 316C, 316A, which can be predictions from times t+1 and t+2, respectively.

In some implementations, associative memory units 300, 302, 304, 306 can, by associating through a middle layer (e.g., middle layers 310B, 312B, 314B, 316B, respectively), which can generate a compressed representation of the input useful for generating the associated output. Based on these compressed features, associative memory units 300, 302, 304, 306 can compute a target object presence readout. The readout might be in a form of a single classifier that, based on the compressed features, can determine if an object (e.g., object 110) is present in the data received by an associative memory unit or not. The readout might also be a finer resolution collection of classifiers that in addition represent the spatial location of the object with respect to the field of view.

Each of associated memory units 300, 302, 304, 306 can use additional information to facilitate predictions. Advantageously, some implementations of this disclosure use trained predictive architecture for visual object tracking, and feed context back into the network.

Figure 4:
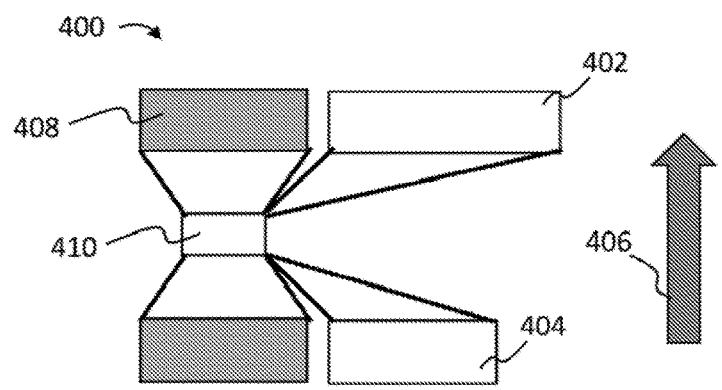
FIG. 4 is a functional block diagram illustrating placement of context and tracker readout in the architecture of an associative memory unit in accordance with some implementations of this disclosure.

FIG. 4 is a functional block diagram illustrating placement of context 404 and tracker readout 402 in the architecture of associative memory unit 400 in accordance with some implementations of this disclosure. Arrow 406 illustrates that, again, associative memory unit 406 is represented with a lower layer for inputs, a middle layer for processing, and an upper layer as the output.

In some implementations, context 404 can be inputted into middle layer 410 during processing. Context 404 may originate in lateral associative memory units, from associative memory units higher in the hierarchical structure (e.g., as described with reference to FIG. 2), and/or from completely different sources containing information relevant for prediction. Non-obviously, it may seem that in the case of reconstructive systems (e.g., autoencoders) that additional context information may not be useful (e.g., all the information needed to reconstruct the signal is already provided). In many implementations, however, context 404 allows associative memory units (and visual system 100) to more rapidly build features good for reconstruction, which may affect the convergence rate of autoencoder-based systems and give a practical advantage.

Middle layer 410 can also output information, such as tracker readout 402, which can include data indicative at least in part of the presence and/or location of object 110. Tracker readout 402 can be a heatmap (e.g., such as the heatmaps discussed with reference to FIG. 2) indicating the likelihood of the presence of object 110 at that particular location. Tracker readout 402 can also include any other target object presence readout. Tracker readout 402 can also be a motor control out, such as a signal by which visual system 100 can activate and/or coordinate movements based at least in part on tracking. These additional signals can be spatially arranged to align with the processed visual data and/or trained to activate whenever object 110 is present in the area seen by an associative memory unit (e.g., what may be referred to as retinotopic or topographic projection).

In some cases, as illustrated, associative memory unit 400 can be said to have the structure of a three-layer perceptron, where the classical output layer 408 is used for reconstruction, and middle layer 400 is used for outputs. A person having ordinary skill in the art should appreciate that there can be more layers. By way of illustration, a deeper 4-layers can be used, wherein the 4-layers can be compared to 13 layers of sigmoidal neurons between the input and the highest level signal (e.g., two layers per each level of the hierarchy plus the input).

Figure 5:
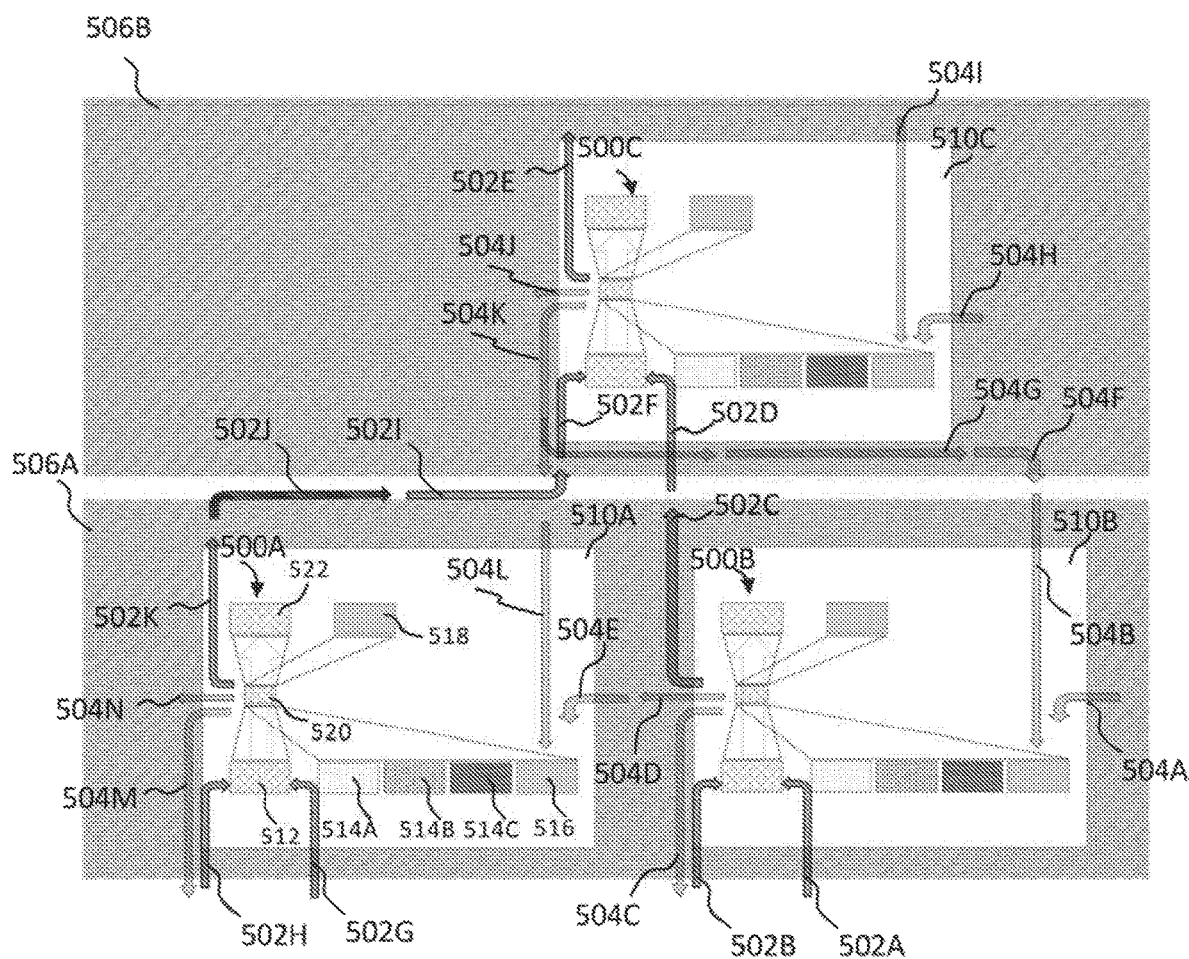
FIG. 5 is a functional block diagram illustrating connections of associative memory units of a visual system in accordance with some implementations of this disclosure.

FIG. 5 is a functional block diagram illustrating connections of associative memory units 500A-500C of visual system 100 in accordance with some implementations of this disclosure. Associative memory units 500A-500C can be divided into a hierarchy. Signals can be compressed at lower levels (e.g., level 506A) and passed to higher levels (e.g., level 506B) where the signals can be concatenated and/or processed again.

As illustrated in feedforward signals include signals processed at a lower level and passed to a higher level. Feedforward signals are illustrated as arrows 502A-502K. Feedback/lateral context connections are illustrated as arrows 504A-504N. Advantageously, compressed predictive/autoencoded features informed by context can be useful for identifying an object (e.g., object 110) in a sequence of frames better than any features learned from static frames.

In some implementations, associative memory units 500A-500C can operate in two modes, serving two functions: (1) creating (and/or learning) associations or a mapping between past and present signals; and (2) making a prediction based on the current signal.

In addition, associative memory units 500A-500C can provide a compressed representation of its prediction which can be passed further up the hierarchy (e.g., from a lower level to a higher level, such as from level 506A to level 506B). The network can be trained using regular back propagation of error, or as a restricted Boltzmann machines, and other systems and/or methods for learning in artificial neural networks. Associative memory units 500A-500C can also implement clustering algorithms, where the representation of data is compressed.

Although two levels are illustrated in FIG. 5, there can be any number of levels, including 3, 4, 5, 6, or more levels (e.g., as illustrated in FIG. 2), which can be used in combination or alternatively to levels 506A-506B. Additional levels can provide additional perception and/or abstraction of data. However, the desired number of levels may be constrained by additional hardware, processing, and/or performance costs in some cases.

As illustrated in FIG. 5, each associated memory unit 500A-500C is predictive. By way of illustration, associated memory unit 500A can receive a primary signal at frame 512, which can be a lower layer. The primary signal can be a data signal comprising data from time t, which can be at least a portion of sensor data generated by sensor unit 106 (e.g., a portion of an image). The primary signal can be delivered to associated memory unit 500A via connections represented by arrows 502G, 502H.

Frame 512 can be compressed in middle layer 520. Such compression can also take into account one or more other inputs, such as inputs 514A-514C and context 516. Inputs 514A-514C can be precomputed functions (e.g., features) of the signal. Any number of functions can be used, as may be informative for object tracking. For example, precomputed functions can perform transformations on the data signal. In the case of images, these transformations can extract characteristics of the signal, remove noise, sharpen edges, soften edges, increase contrast, etc. By way of illustration, input 514A can be an integral of the signal in frame 512, input 514B can be the derivative of the signal in frame 512, and input 514C can be an error function of the signal in frame 512. In some cases, such an error function can be indicative of errors for some associative memory units, all associative memory units, some levels of associative memory units, etc. In this way, the error function can allow middle layer 520 to adjust for realized and/or propagated errors.

Middle layer 520 can output additional signal 518, which can be substantially similar to tracker readout 402. Middle layer 520 can also output predictive compressed features that can be outputted as data signals on connections as represented by arrows 504N, 504M as feedback/lateral context connections. These feedback/lateral context connections can serve as context for associative memory units in level 506A or lower. The predictive compressed features can also be sent to levels higher than 506A, such as level 506B, as feedforward connections as represented by arrow 502K, 502J, 502I, 502F. In a similar way, associative memory unit 500A, and more specifically middle layer 520, can receive context 516 comprising data signals received from other associative memory units, such as from associative memory unit 500B as represented by arrow 504D-504E and associative memory unit 500C as represented by arrow 504K-504L.

Frame 522 can then be a constructed predicted data signal for time t+1, wherein the predicted data can construct data indicative of a prediction of the motion of object 110 within the data. Once the predicted signal in frame 522 and additional signal 518 are known, a training step can take place that associates the data available at time t with the actual data signal available at time t+1. In some cases, there can be an error (e.g., a difference) between the predicted data signal (e.g., from frame 522) and the actual data signal, which can then be used in error functions as aforementioned.

Figure 6:
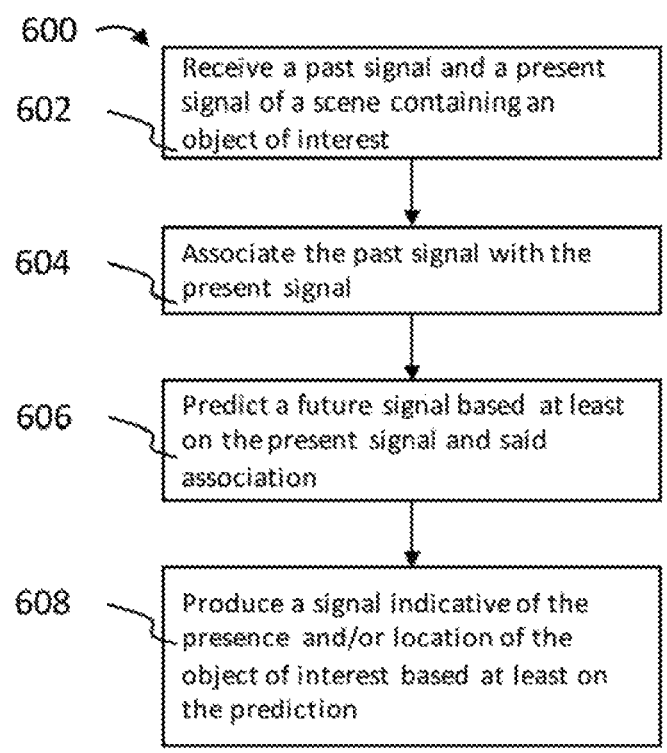
FIG. 6 is a process flow diagram of an exemplary method for processing information in a predictive encoder used for object tracking in accordance with principles of the present disclosure.

FIG. 6 is a process flow diagram of an exemplary method 600 for processing information in a predictive encoder used for object tracking in accordance with principles of the present disclosure. Portion 602 can include receiving a past signal and a present signal of a scene containing an object of interest. For example, the past signal and the present signal can be any data signals described in this disclosure, including at least a portion of an image. Portion 604 can include associating the past signal with a present signal. Portion 606 can include predicting a future signal based at least on the present signal and said association. Portion 608 can include producing a signal indicative of the presence and/or location of the object of interest based at least on the prediction.

Figure 7:
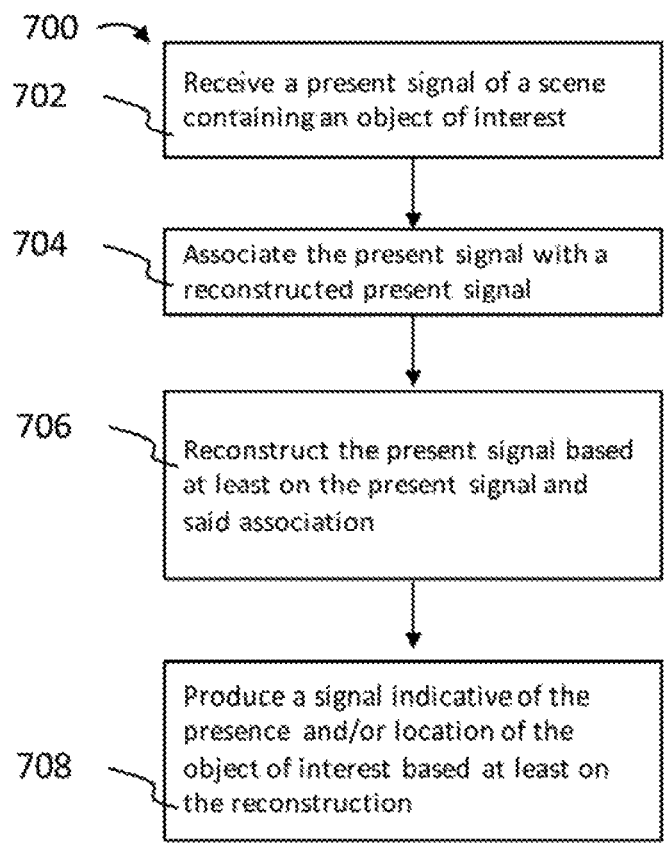
FIG. 7 is a process flow diagram of an exemplary method for processing information in an autoencoder used for object tracking in accordance with principles of the present disclosure.

FIG. 7 is a process flow diagram of an exemplary method 700 for processing information in an autoencoder used for object tracking in accordance with principles of the present disclosure. Portion 702 can include receiving a present signal of a scene containing an object of interest. Portion 704 can include associating the present signal with a reconstructed present signal. In some cases, this can include associating the present signal with itself. Portion 706 can include reconstructing the present signal based at least on the present signal and said association. Portion 708 can include producing a signal indicative of the presence and/or location of the object of interest based at least on the reconstruction.

Figure 8:
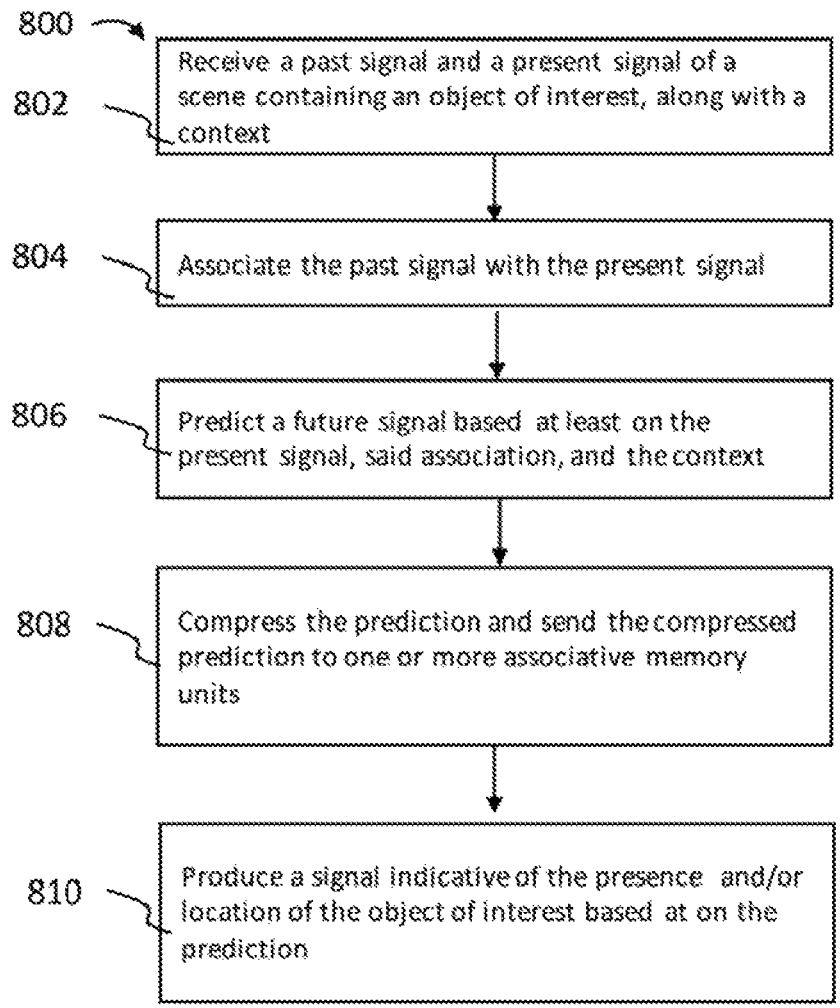
FIG. 8 is a process flow diagram of an exemplary method for processing information in a predictive encoder used for object tracking in accordance with principles of the present disclosure.

FIG. 8 is a process flow diagram of an exemplary method 800 for processing information in a predictive encoder used for object tracking in accordance with principles of the present disclosure. Portion 802 can include receiving a past signal and a present signal of a scene containing an object of interest, along with a context. Portion 804 can include associating the past signal with the present signal. Portion 806 can include predicting a future signal based at least on the present signal, said association, and the context. Portion 808 can include compressing the prediction and sending the compressed prediction to one or more associative memory units. Portion 810 can include producing a signal indicative of the presence and/or location of the object of interest based at least on the prediction.

Figure 9:
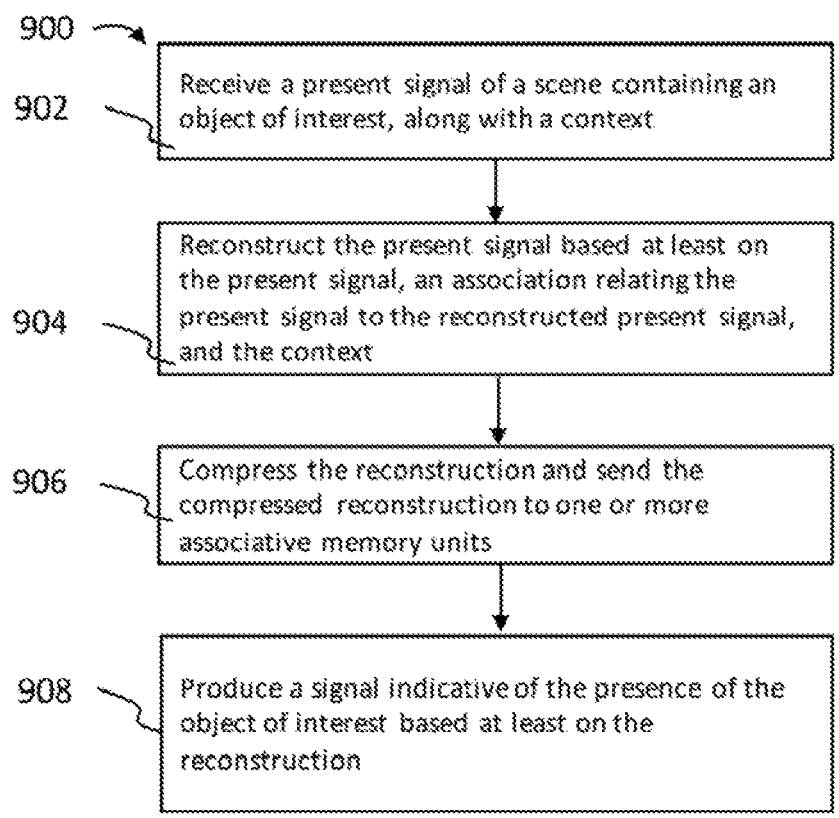
FIG. 9 is a process flow diagram of an exemplary method for processing information in an autoencoder used for object tracking in accordance with principles of the present disclosure.

FIG. 9 is a process flow diagram of an exemplary method 900 for processing information in an autoencoder used for object tracking in accordance with principles of the present disclosure. Portion 902 includes receiving a present signal of a scene containing an object of interest, along with a context. Portion 904 includes reconstructing the present signal based at least on the present signal, an association relating the present signal to the reconstructed present signal, and the context. In some cases, said association can include associating the present signal to itself. Portion 906 includes compressing the reconstruction and sending the compressed reconstruction to one or more associative memory units. Portion 908 includes producing a signal indicative of the presence of the object of interest based at least on the reconstruction.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for tracking an object, comprising:
a plurality of associative memory units, each being configured to execute computer readable instructions to,
receive a first input signal, the first input signal being received at a first time step,
associate a past signal with the first input signal the past signal being received prior to the receipt of the first input signal, the first input signal and the past signal includes information regarding the object and a context,
produce a predicted signal for a second time step during the first time step, the second time step occurs subsequent to the first time step, the predicted signal being based on at least the first input signal, the association and the context,
receive a second input signal, the second input signal being received at the second time step; and determine an error function based on the predicted signal and the second input signal.

2. The system of claim 1, wherein the predicted signal corresponds to a motion of the object.

3. The system of claim 1, wherein the associative memory units are configured to,
receive a plurality of input frames corresponding to data signals pertaining to the object at a first time and a second time, the second time is after the first time, the plurality of input frames corresponding to portions of images.

4. The system of claim 1, wherein each of the plurality of associative memory units includes a lower layer configured to receive the first or second input signals, a middle layer configured to compress the first or second input signals to produce a tracker readout, and an upper layer configured to produce the predicted signal based in part on the tracker readout, the lower, middle and upper layers being separate and distinct from each other.

5. The system of claim 4, wherein the middle layer of the associative memory units is configured to receive the context, the context corresponds to spatial and temporal context of the object, and the tracker readout corresponds to presence and location of the object, the presence and location of the object corresponds to a heatmap.

6. The system of claim 4, wherein the plurality of associative memory units are arranged in a hierarchy comprising at least an upper level and a lower level, the lower level includes at least two associative memory units.

7. The system of claim 6, wherein the at least two associative memory units of the lower level receive context signals based on the tracker readouts of associative memory units of the lower level and the upper level.

8. The system of claim 7, wherein the predicted signals of the plurality of associative memory units are produced based at least in part on the context signals.

9. The system of claim 7, wherein the lower, middle, and upper layers of the associative memory units embody at least one of: a neural network, an autoencoder, or a clustering algorithm.

10. The system of claim 6, wherein the input layers of associative memory units of the upper level receive the tracker readouts of associative memory units of the lower level.

11. The system of claim 4, wherein the associative memory units of the upper level provide feedback to the associative memory units of the lower level, the feedback being based on the error function, the feedback configures the middle layers to adjust the predicted signals provided to the upper layers.

12. The system of claim 4, wherein the input signals received correspond to portions of an image captured by a sensor on a robotic device.

13. The system of claim 12, wherein the tracker readout comprises one of (i) an identification of a location of an object within the image portion provided to the respective associative memory unit, or (ii) a signal which indicates a presence of the object within the image portion.

14. The system of claim 13, wherein the tracker readouts of the plurality of associative memory units comprise a heat map, the heat map indicates a likelihood of a presence of an object at a location within the image portion.

15. The system of claim 1, wherein the plurality of associative memory units is configured to execute the computer readable instructions to operate in a first configuration and a second configuration, the first configuration corresponds to the associative memory units creating associations between a past input signal and first input signals, the second configuration corresponds to making a prediction based on the first input signal.

16. A method for tracking an object, comprising:
associating a past signal with a first input signal, the past and first input signals being received by a plurality of associative memory units, the first input signal being received at a first time step subsequent receipt of the past signal, the past and first input signals includes information regarding the object and a context;
producing a predicted signal for a second time step during the first time step, the second time step occurs subsequent the first time step based on at least the first input signal, the association and the context;
receiving a second input signal, the second input signal being received at the second time step; and
determining an error function based on the predicted signal and the second input signal
wherein,
each associative memory unit comprises:
a lower layer configured to receive the first or second input signals,
a middle layer configured to compress the first or second input signals to produce a tracker readout, and
an upper layer configured to produce the predicted signal; and
the plurality of associative memory units are arranged in a hierarchy comprising at least an upper level and a lower level, the lower level includes at least two associative memory units.

17. The method of claim 16, wherein,
associative memory units of the lower level receive context signals based on the tracker readouts of associative memory units of the lower level and the upper level; and
the predicted signals produced by the of the plurality of associative memory units are based at least in part on the context signals.

18. The method of claim 17, wherein,
the input layers of associative memory units of the upper level receive the tracker readouts of associative memory units of the lower level; and
the associative memory units of the upper level provide feedback to the associative memory units of the lower level, the feedback being based on the error function, the feedback configures the middle layers to adjust the predicted signals provided to the upper layers.

19. The method of claim 17, wherein the input signals received correspond to portions of an image captured by a sensor of a robotic device.

20. The method of claim 19, wherein the tracker readouts correspond to compressed representations of the portions of the image.

21. The method of claim 20, wherein the tracker readout comprises one of (i) an identification of a location of an object within the image portion provided to the respective associative memory unit, or (ii) a signal which indicates a presence of the object within the image portion.

22. The method of claim 21, wherein the tracker readouts of the plurality of associative memory units comprise a heat map and the heat map indicates a likelihood of a presence of an object at a location within the image portion.

23. The method of claim 16, wherein,
the lower, middle, and upper layers of the associative memory units embody at least one of: a neural network, an autoencoder, or a clustering algorithm.

24. A non-transitory computer readable medium having a plurality of computer readable instructions stored thereon, that when executed by at least one processor, configure the at least one processor to,
    embody a plurality of associative memory units configured to,
        receive a first input signal, the first input signal being received at a first time step;
        produce a predicted signal for a second time step during the first time step, the second time step occurs subsequent to the first time step;
        receive a second input signal, the second input signal being received at the second time step; and
        produce an error function based on the predicted signal and the second input signal,
    wherein,
    each associative memory unit comprises:
        a lower layer configured to receive the first or second input signals,
        a middle layer configured to compress the first or second input signals to produce a tracker readout, and
        an upper layer configured to produce the predicted signal; and
    the plurality of associative memory units are arranged in a hierarchy comprising at least an upper level and a lower level, the lower level includes at least two associative memory units.

\* \* \* \* \*